United States Patent
Zaitsev

(10) Patent No.: US 8,484,727 B2
(45) Date of Patent: Jul. 9, 2013

(54) SYSTEM AND METHOD FOR COMPUTER MALWARE DETECTION

(75) Inventor: Oleg V. Zaitsev, Smolensk (RU)

(73) Assignee: Kaspersky Lab ZAO, Moscow (RU)

( * ) Notice: Subject to any disclaimer, the term of this patent is extended or adjusted under 35 U.S.C. 154(b) by 945 days.

(21) Appl. No.: 12/323,835

(22) Filed: Nov. 26, 2008

(65) Prior Publication Data

US 2010/0132038 A1    May 27, 2010

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .............................................. 726/22; 726/24

(58) Field of Classification Search
USPC ...................................... 726/22, 24
See application file for complete search history.

(56) References Cited

U.S. PATENT DOCUMENTS

| 5,844,824 A * | 12/1998 | Newman et al. ............... 345/156 |
| 2003/0135791 A1* | 7/2003 | Natvig ............................. 714/38 |
| 2004/0181788 A1* | 9/2004 | Kester et al. .................. 717/168 |
| 2006/0294588 A1* | 12/2006 | Lahann et al. .................. 726/23 |

* cited by examiner

*Primary Examiner* — Ashok Patel
*Assistant Examiner* — Lawrence Cosby
(74) *Attorney, Agent, or Firm* — Arent Fox LLP; Michael Fainberg

(57) ABSTRACT

Disclosed are systems and methods for computer malware detection. The system is configured to emulate execution of a program code, monitor events of program execution, classify the monitored events as malicious or non-malicious, and collect information about unclassifiable events. The system further includes one or more analyst workstations configured to isolate a program analyst from external audiovisual stimuli. The workstation includes a video output device operable to display a list of unclassifiable events and event-related information to the program analyst and a user input device operable to receive analyst's physiological response indicative of whether the displayed list of unclassifiable events exhibits malicious behavior.

17 Claims, 5 Drawing Sheets

SYSTEM AND METHOD FOR COMPUTER MALWARE DETECTION

TECHNICAL FIELD

The present application relates generally to the field of computer software and more specifically to detection of malicious programs via analysis of events of program execution.

BACKGROUND

Computer malware, such as viruses, worms and Trojan horses, presents one of the most significant security threats to computer systems. It is estimated that yearly financial losses of U.S. businesses caused by malware is in the tens of billions of dollars. To combat the increasing spread of computer malware, a number of antivirus detection techniques have been developed. Most detection techniques generally operate by scanning the program code and comparing portions thereof with a collection of known malicious codes contained in a "library." If a substantial similarity is found between the two, the code is flagged as malicious.

Another popular approach for detecting computer malware is via heuristic analysis of the program code. Heuristic analysis is a behavior-based technique in which a computer program is emulated in a secure computer environment, e.g. a virtual computer, thereby simulating what would happen if the program were to be executed while keeping the suspicious code isolated from the real-world machine. Behavior of the emulated program is analyzed for common malicious actions such as replication, file overwrites, and attempts to hide the existence of the suspicious file. If malicious actions are detected, the program is flagged as malicious.

However, these techniques may fail to detect or to provide conclusive results when presented with codes not contained in the library or codes having suspicious, but not clearly malicious behavior. In such cases, the suspicious code may be sent to a human analyst, who would review the code and decides whether such code is malicious. The process of human review generally provides accurate results, however it is time consuming and inefficient. Accordingly, there is need for a more efficient technique of malware detection.

OVERVIEW

Disclosed are systems and methods for computer malware detection. In one example embodiment, the system is configured to emulate execution of a computer program, monitor events of program execution and classify the monitored events as malicious or non-malicious. For unclassifiable events, the system is operable to collect various reference and statistical information and forward it to human analysts for review. The system further includes one or more analyst workstations configured to isolate program analysts from external audiovisual stimuli. The workstation includes a video output device operable to display one or more unclassifiable events and event-related information to the program analyst. The workstation further includes a user input device operable to receive analyst's physiological response indicative of whether the displayed unclassifiable events exhibits malicious behavior. The system significantly improves efficiency and accuracy of detection of new and known malware.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DETAILED DESCRIPTION OF EXAMPLE EMBODIMENTS

Example embodiments are described herein in the context of a system and method for detecting malicious behavior of computer programs. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
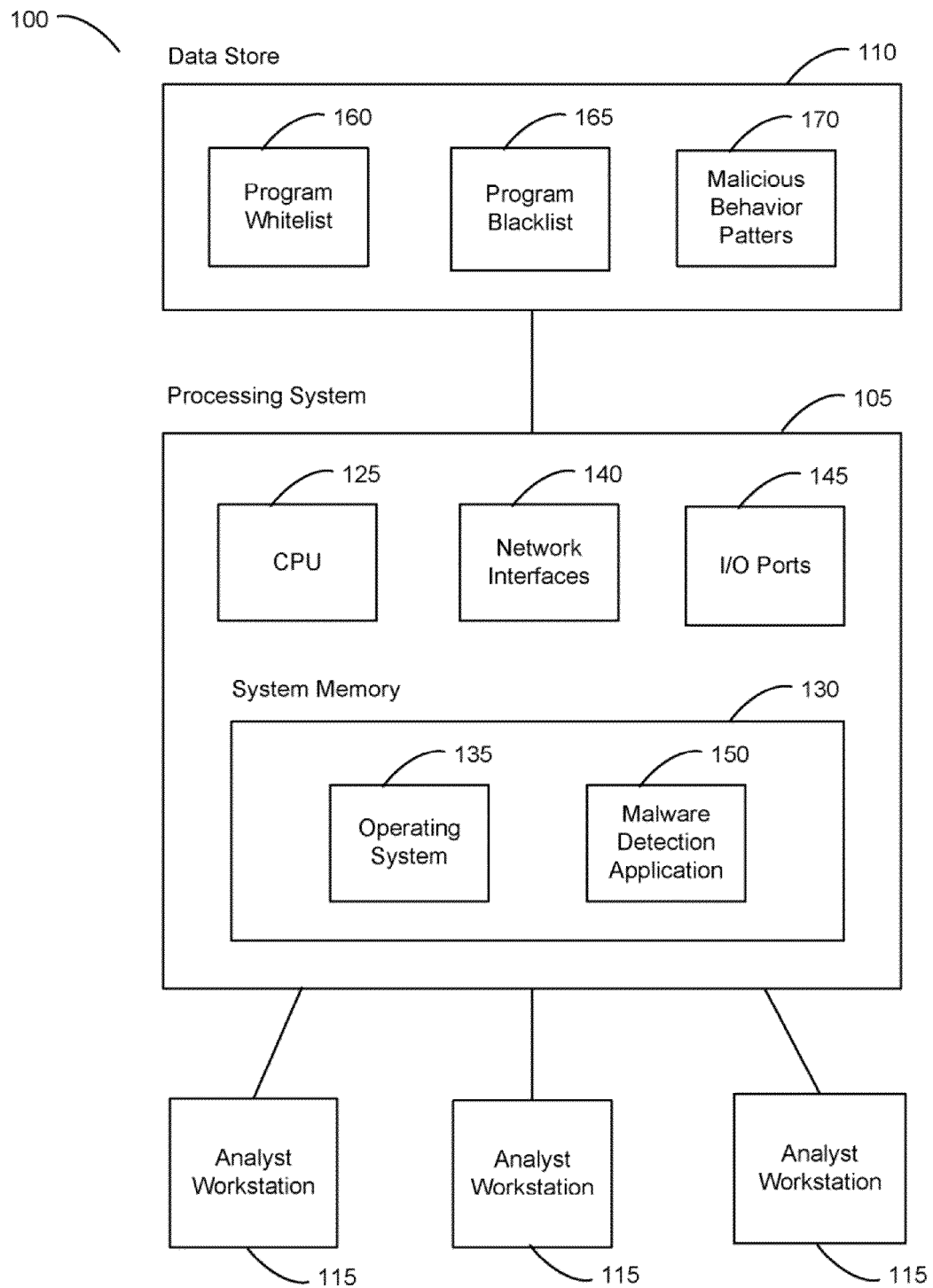
FIG. 1 illustrates one example embodiment of the malware detection system.

FIG. 1 illustrates one example embodiment of a malware detection system. In general, system 100 includes a processing system 105 operable to emulate, analyze and classify as malicious or non-malicious various computer programs. The system further includes a data store 110 connected to the processing system 105. The data store contains information about known malicious software, such as viruses, worms, Trojan horses, spyware and other types of harmful or unwanted programs. System 100 further includes one or more analyst workstations 115 connected to the processing system 105. The workstations allow program analysts 120, i.e., trained malware experts, to analyze unclassifiable events of program execution. Workstations 115 are configured to optimize efficiency with which program analysts 120 review unclassifiable program events and communicate results of their analysis to processing system 105.

In one example embodiment, processing system 105 may includes one or more computer servers, such blade or rack-mounted servers. The system may have one or more processors 125, such as Intel Quad-Core® or AMD™ Turion 64 processor 125, and run one or more operating systems 135, such as Windows®, Unix®, Mac OS and/or other types of OS. System 105 may have one or more hard drive disks, flash drives, random access memory (RAM) or other types of dynamic, volatile and nonvolatile information storage medium 130 for storage of the operating system, run-time data and various program resources necessary for operation of processing system 105. The system may further include a network interface 140, such as Ethernet, for accessing the Internet or other local or wide area network, and various serial and parallel I/O ports 145 for connecting peripheral devices. Those of ordinary skill in the art will appreciate that processing system 105 may have additional hardware and software components.

Figure 2:
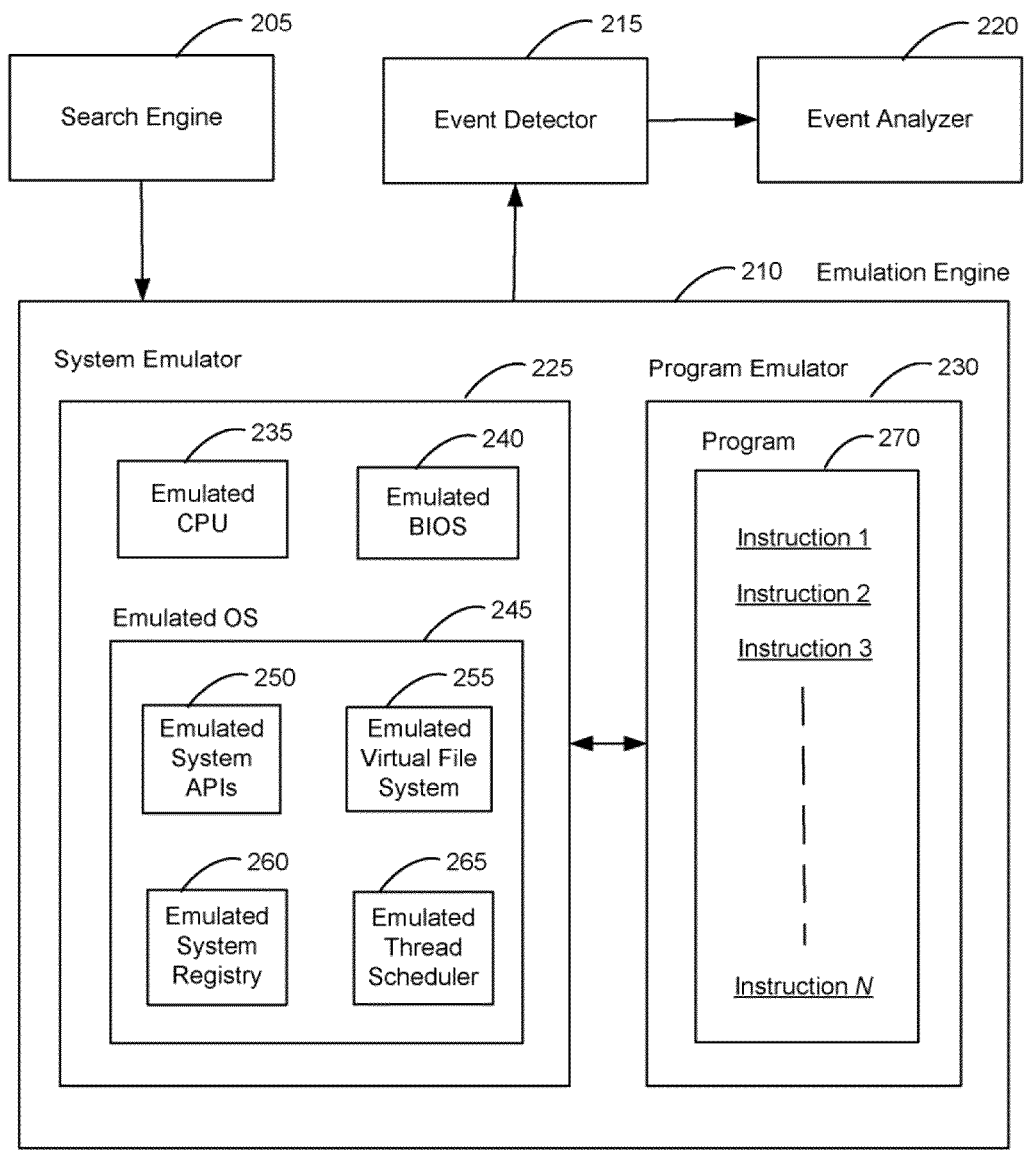
FIG. 2 illustrates another example embodiment of the malware detection system.

In one example embodiment, processing system 105 is configured to run a malware detection application 150. With reference to FIG. 2, malware detection application 150 may include a search engine 205, emulation engine 210, event detector 215 and event analyzer 220. Emulation engine 210 may include a system emulator 225 and program emulator 230. In one example embodiment, the entire malware detection application 150 may run on a single application server. In alternative embodiment, operation of the malware detection application may be distributed among several servers with different application components running on different servers. It should be noted that the disclosed configuration of malware detection application 150 is merely exemplary and application functionality may be embodied in fewer or more software components as understood by those of ordinary skill in the art. Functionality of the various application components will be described next with greater particularity.

In one example embodiment, malware detection application 150 includes search engine 205, such as Google®, Yahoo® Search or a custom web crawler. The search engine is configured to search the Internet and other networks for new applications, programs and other types of software, which are then analyzed for presence of malicious code. In one example embodiment, all new programs discovered by search engine 205 may be compared with a program whitelist 160 stored in data store 110. The whitelist identifies programs that have previously been classified by the system as non-malicious or legitimate. If the program does not appear in the whitelist is may be passed on to emulation engine 210 to be analyzed for presence of malware. In another example embodiment, all newly discovered programs may be compared with a program blacklist 165 also contained in data store 110. The blacklist identifies programs that have previously been classified as malicious. If the program is already blacklisted it may be discarded and no further analysis of that program is conducted by the application 150.

In one example embodiment, malware detection application 150 includes emulation engine 210 operable to emulate computer programs 260 in order to detect malicious behavior therein. To that end, emulation engine 210 may include system emulator 225 and program emulator 230. System emulator 225 is configured to emulate one or more components of a computer system in an isolated, secure computer environment of processing system 105. For example, a portion of the random access memory 130 may be used to create such an isolated, secure computer environment for emulation of computer programs. System emulator 225 may emulate several components of a computer system, including but not limited to CPU 235, BIOS 240 and OS 245, which may include system APIs 250, such as Win32 APIs and the like, virtual file system 255, system registry 260, thread scheduler 265 and other essential system components. The system emulator 225 is operable to emulate different system configurations depending on the requirements of the program 270 being emulated by the program emulator 230.

Emulation engine 210 may further include program emulator 230 configured to emulate execution of one or more programs 270 in an isolated, secure environment of processing system 105 using system emulator 225. Program emulator 230 may be operable to load program 270 from system memory 130, or another local or remote location, into the portion of RAM 130 allocated to the isolated, secure computer environment in which emulation of the program 270 to be performed. Prior to emulation, program emulator 230 may scan program 270 to determine that system emulator 225 has all necessary resources for emulation of the program. The program emulator may also decompress compressed any programs 270 and perform other preliminary processing. Program emulator 230 may then begin reading program instructions, such as instructions 1 through N, and emulate them using system emulator 225.

In one example embodiment, system emulator 225 is configured to emulate execution of one or more executable components of computer program 270. Various executable components may include the program itself and various copies of program, which may be created during program emulation. Executable components may also include subprograms of program 270, which may operate semi-independently of the program and perform certain tasks, which may be different but related to those of program 270. Executable components may also include related or unrelated programs, applications or files called by the program in the course of program execution. For example, program 270 may call Internet Explorer® application to connect and download a file from the Internet or activate Microsoft Outlook® to retrieve some email information. Executable components may also include dynamic link libraries (DLL) used by the program, such as Windows DLL and others. Those skilled in the art will recognize that the above list of executable components is not exhaustive and there are other types of programs, files, applications, scripts and macros that may be emulated concurrently with program 270.

There are several ways in which various executable components of program 270 may be executed in emulation engine 210. For example, components may be executed as a main process of program 270, as various child processes of the main process, as grandchild processes of the main process and so on. A computer process may be defined as an instance of execution of program 270. A child process may be defined as a computer process created by another process (the parent process). In another example, executable components of program 270 may be executed as one or more threads of execution, including one or more remote threads. Various executable components of program 270 may be executed consecutively and/or in parallel with each other. To enable parallel execution of several processes, which generally increases the speed of program emulation, system emulator 225 may emulate a multitasking computer architecture, including multitasking emulated CPU 235 and multitasking emulated OS 245, which support parallel processing of various processes and thread of execution of programs 270.

In one example embodiment, malware detection application 150 may also include event detector 215, which facilitates detection of events generated by emulated computer program 270 and its various executable components. The detected events may include one or more system calls, such as native system calls and API calls, and system responses to these calls. Example events that may be detected by the event detector 215 include, but are not limited to, the computer program making a copy of itself, the computer program creating a new file, the new file copying itself into OS system catalog, the computer program creating a new key in the OS registry, modifying the registry, and the like. It should be noted that events detected by the event detector 215 are not only events necessarily indicative of malicious behavior of the computer program or its executable components. The detected events may be harmless events generated by legitimate programs, which do not cause any harm to processing system 105. The detected events are then sent in real time to event analyzer 220 for further processing.

In one example embodiment, event analyzer 220 is operable to compare the received event data with malicious event patterns 170 and classify the emulated program as malicious or non-malicious. Event pattern 170 may include one or more events which are considered malicious or harmful to a computer system. In one example embodiment, the event analyzer may perform event analysis on the fly as events are being generated by emulation engine 210. In another example embodiment, the analysis may be performed after the entire program has been emulated. When one or more generated events match one or more malicious events 170, event analyzer 220 may classify the given event as malicious and instruct emulation engine 210 to terminate program emulation. If the generated events do not resemble any malicious behavior patterns, event analyzer 220 may classify the event as non-malicious and terminate program emulation. If, however, event analyzer 220 cannot conclusively determine whether the generated event is malicious or not, event analyzer 220 may declare the event as unclassifiable.

In one example embodiment, the unclassifiable events may be sent via workstations 115 to program analysts for review. Program analysts are persons with great expertise in the field of malware detection. They assist malware detection application 150 in analyzing program events that application 150 failed to classify as malicious or non-malicious. Such unclassifiable events may be attributed to legitimate programs that exhibit suspicious behavior, which cannot be classified as "non-malicious" by the application 150 with a predefined degree of certainty, e.g. 70%. Such events may also be attributed to malicious programs that exhibit suspicious behavior, which cannot be classified as "malicious" by the application 150 with a predefined degree of certainty. The unclassifiable events may be attributed to new breeds of computer viruses, worms, Trojan horses, spyware and other harmful programs, with previously unseen behavior patterns, which application 150 cannot conclusively declare as non-malicious.

To enable program analysts efficiently and effectively analyze the unclassifiable events, processing system 105 may extract and format event-related information for analyst's review. For example, the system may remove all duplicate events from the program code and instead display an event counter indicating how many times the given event was repeated by the program. It may organize information about unclassifiable events in a user friendly format, such as listing of all unclassifiable events along with event information, such as various function arguments and the like. The system may also display actual program code that invoked the given event as well as system responses to that code. There are numerous other ways in which program/event information may be formatted and presented to the analysts. For example, information may be visualized using different font types, sizes and colors.

In one example embodiment, the processing system may provide to the analyst various reference information about unclassifiable events. Such information may include, but is not limited to, information about malicious behavior patterns 170 that most closely resemble the unclassifiable event, information about the family of functions, objects or programs associated with the unclassifiable event, as well as information about files or programs that unclassifiable event attempted to create, open, write to, delete or copy. The processing system may also provide various statistical information about the unclassifiable event, such as frequency of occurrence of the unclassifiable event in the program code, frequency of occurrence of the unclassifiable event in known malicious programs, including the types of those programs, and/or frequency of occurrence of the unclassified event in the known non-malicious programs, including the types of those programs. Other information may be also provided to the analysts.

Figure 3:
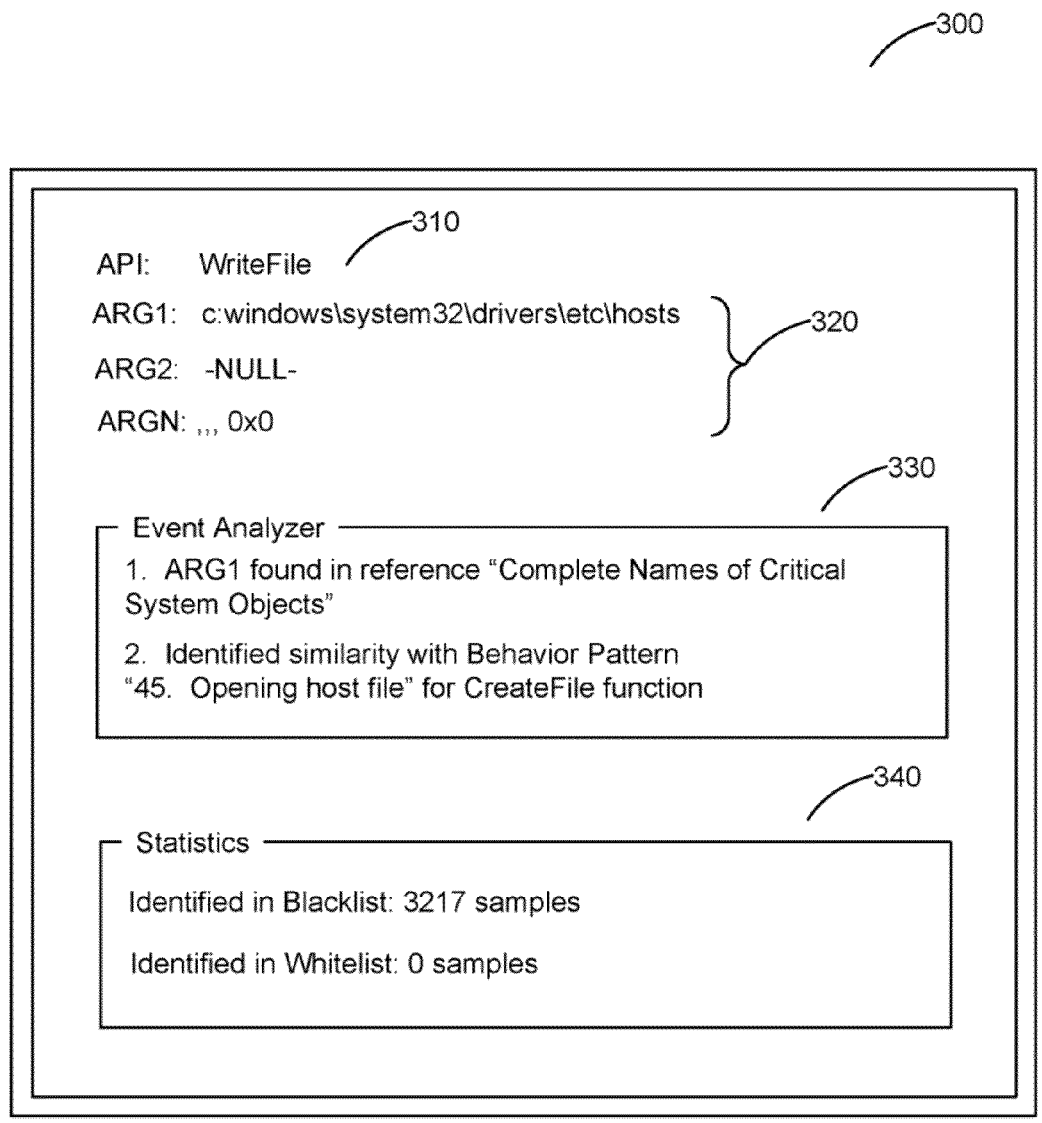
FIG. 3 illustrates an example system interface presented to a program analyst.

FIG. 3 illustrates a sample system interface with information about unclassified events presented to a program analyst. The presented information may include one or more unclassifiable events 310, such as API calls made by the emulated program, e.g., API: WriteFile, and arguments of the API call, e.g., ARG1, ARG2, ARGN. It may also include reference information 330, such as that ARG1 was found in reference "Complete Names of Critical System Objects" and that unclassifiable event is identified with behavior pattern for "Opening Host File". It may also include statistical information 340, such as information indicating that the unclassifiable event was found 3217 times in the program blacklist and was not found in whitelist. Those of ordinary skill in the art will appreciate that presented interface is merely exemplary and there may be many different formats of presenting this and other information.

Having reviewed the event-related information the program analyst may classify the event as malicious, non-malicious or unclassifiable. The unclassifiable events may be automatically and in real-time forwarded to other program analyst for review, who may be able to classify these event. The more program analysts are available to review unclassifiable events, the greater is the likelihood of successful event classification. In alternative embodiment, the unclassifiable event may be temporarily stored by the system and presented to the same analyst at a later time, such as a week or two later. Yet in another embodiment, information about unclassifiable events may be printed out in a form of a report and reviewed by the analyst at a later time and/or discussed with his colleagues. Those of skill in the art we recognize that there may be many variations of the above techniques for dealing with unclassifiable events.

In one example embodiment, processing system 105 may be configured to distribute the unclassifiable events to program analysts based on analyst's specialization, workload or other parameters. For example, if malware detection application 150 determines that behavior of an unclassifiable event is attributed to Trojan horse type of malware, the system may send this event to the program analyst specializing in Trojan horses. In another example, if system 105 determines that a first analyst has an event queue of 500 events to examine and a second analyst has an event queue of 1000 events, it will send the new unclassifiable events to the first analyst. In another embodiment, the system may send the same event to two or more analysts and compare their responses to assure accuracy of the classifications. Yet in another embodiment, the system may periodically resend previously classified events to the same analyst to assure that his analysis is consistent, thereby assuring accuracy of classification of events.

In one example embodiment, system 100 includes one or more analyst workstations 115. A workstation may be a computer terminals, having a processor, a memory and a network interface for connecting to processing system 105 via a local area network, such as Ethernet. Each workstation may also include a video output device operable to display information about unclassifiable events to the program analyst. The workstation may also include a user input device operable to receive analyst's physiological response indicating whether the unclassifiable event is malicious or not. In one example embodiment, the workstations may be physically isolated from the outside environment and separated from each other to isolated program analysts from any external audiovisual stimuli, so as to provide quiet work environment.

To further accomplish this goal, the video output device of each workstation 115 may include a head-mounted video display embedded in video helmets or video glasses, such as those described in U.S. Pat. No. 5,321,416, entitled "Head-Mounted Visual Display Apparatus", or U.S. Pat. No. 7,310,072, entitled "Portable Communication Display Device", both of which are incorporated by reference herein in their entirety. The head-mounted video display should be operable to project, for example, a 640*480 resolution image of event-related information, such as those depicted in FIG. 3. This type of video device isolates program analysts from external visual stimuli, which may distract them from the task of event analysis. Analysts may be also provided with headphones or earplugs to block any external noises and other audio stimuli. This isolated work environment enables program-analysts to operate at very high efficiency.

The user input device of workstation 115 may be also optimized to improve analysts efficiency in entering decisions of the program analysis. In one example embodiment, the user input device may include a simple handheld pushbutton device or pressure sensor device responsive to analyst's finger movements. The device may include one or more buttons/sensors. In a multi-button device, each dedicated button may be used to indicate analysts decision of whether or not the presented event is malicious. In a uni-button device, a single click of the button may indicate that the presented event is malicious, a double click may indicate that the event is non-malicious, and a triple click may indicate that event is unclassifiable. There are many different configurations of push-button and pressure sensor devices known to those of ordinary skill in the art, which may be used with in accordance with various embodiments.

There are other techniques for detecting analyst's physiological response to the presented program information, which may be used in alternative embodiments. For example, an audio sensor detecting analyst's voice commands may be used. In another embodiment, a video camera monitoring analyst's eye movements may be used to detect pupil dilations indicating whether the presented program code is malicious or not. The system can be trained for individual analyst, so it can determine analyst's reaction with great accuracy. Yet in another embodiment various sensor monitoring analyst's biosignals may be used. Such devices may include, galvanic skin response (GSR) sensor, electroencephalogram (EEG) system, which records analyst's brain activity, or electrocardiogram (ECG) system for monitoring analyst's heart rate. These and other techniques known to those of ordinary skill in the art may be used to detect analyst's physiological response indicating whether program events are malicious or not.

Figure 4A:
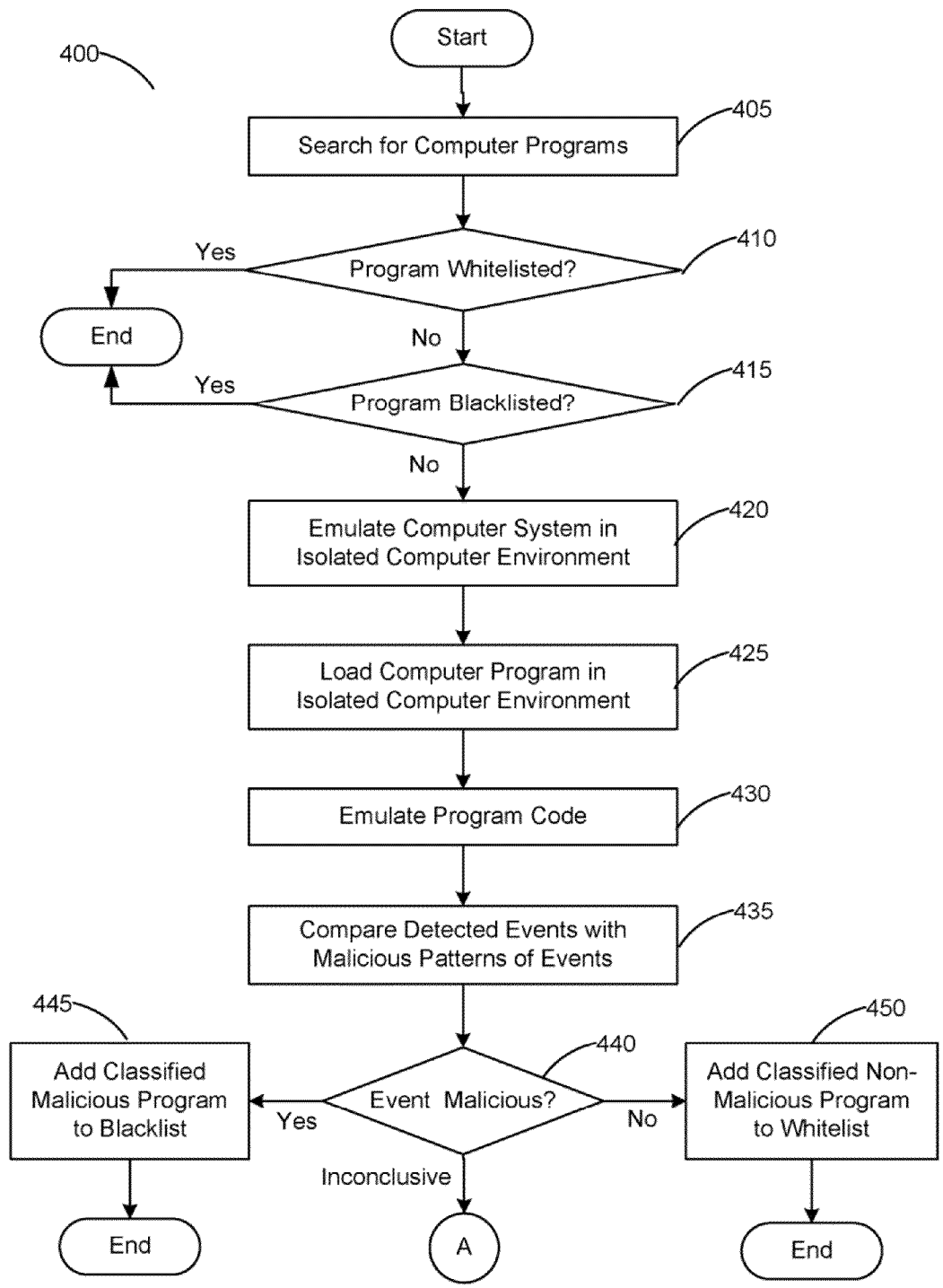
FIGS. 4A and B illustrates one example embodiment of a malware detection process.
Figure 4B:
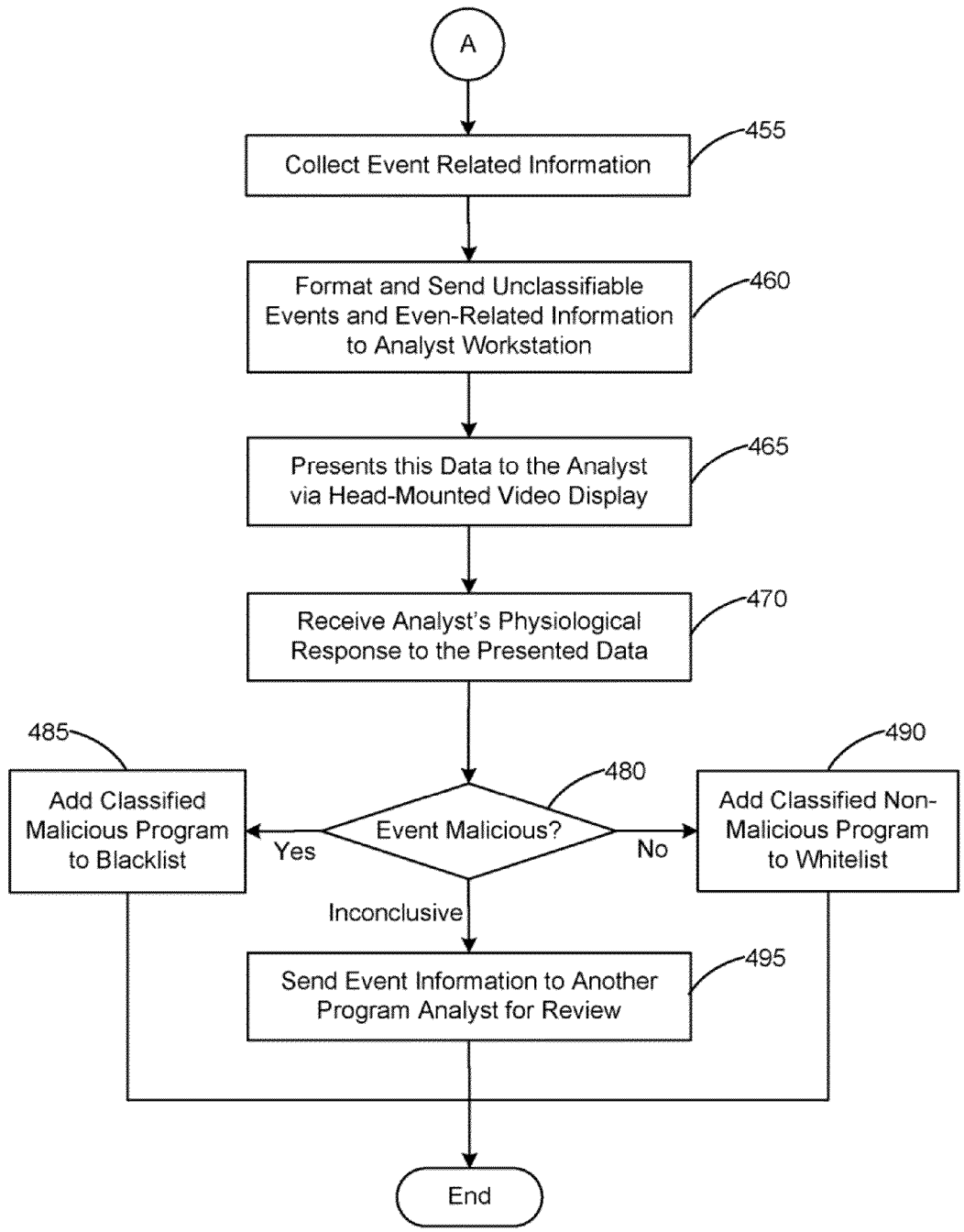

FIG. 4 illustrates one example embodiment of a method for malware detection using a system described herein. At step 405, the processing system searches the Internet for newly created programs and applications. For each encountered program the system checks with its program database if the program is whitelisted, step 410, or blacklisted, step 415. If program appears in either of the databases the program is discarded. If the program does not appear in either database, the processing system activates the emulation engine, step 420. The emulation engine loads the program in an isolated computer environment, step 425, and emulates the program using system and program emulators, step 430. Events of program execution are detected and compared with malicious patterns of events as described above, step 435. Based on the results of this analysis, the program is classified by the processing system as malicious, non-malicious or unclassifiable.

If program is classified as malicious, step 440, it is added to the program blacklist, step 445. If program is classified as non-malicious, it is added to the program whitelist, step 450, and emulation of the program is terminated. If processing system determines that program is unclassifiable, the system collects available information about the unclassifiable events, step 455, formats it and sends it to the analyst workstations, step 460. The event-related information is presented to the analyst via a head-mounted video display, step 465. The system then detects analyst's physiological response to the presented information, the response indicating whether the unclassifiable event is malicious or non-malicious, step 470. If event is classified as malicious, step 480, the program is added to the program blacklist, step 485. If program is classified as non-malicious, it is added to the program whitelist, step 490 and emulation of the program may be terminated. If analyst fails to classify the event, the event information may be send to another analyst for review, step 495, or other above-described actions may be taken.

It should be noted that even though an emulation-based processing technique has been described in example embodiments, in alternative embodiments, the processing system may use other methods for malware detection. For example, the processing system may be configured to execute programs directly using real, i.e., not emulated, system resources, such as CPU 125, memory 130, OS 135, etc, instead of the emulated system. Upon completion of program execution, the system resources utilized by the malware detection application may be released back to the processing system and all run-time data may be erased. The processing system may have to be reset to remove files infected by malicious programs. Other malware detection techniques known to those skilled in the art may be used in alternative embodiments.

The systems and methods disclosed herein provide high efficiency and accuracy of analysis of known and unknown software programs and applications. The analysts are isolated from external audiovisual stimuli and provided with convenient data input devices. They are presented with program events, which can be quickly analyzed on the fly. The system allows classification of more than 3000 events in one hour. Analyst's work becomes automatic, almost reflexive. Furthermore, since repetitive events are removed and not presented to the analyst, a classification of an event can be applied to the repetitive events as well. Thus, if event X is repeated 2572 in a program, a single classification of this event will apply to all of its instances.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM, PROM and EEPROM, FLASH Memory, Jump Drive and the like), magnetic storage medium (e.g., tape, magnetic disk drive and the like), optical storage medium (e.g., CD-ROM, DVD-ROM and the like) and other types of program memory.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompasses present and future known equivalents to the known components referred to herein by way of illustration. More over, while embodiments and applications have been shown and described, it would be apparent to those skilled in the art having the benefit of this disclosure that many more modifications than mentioned above are possible without departing from the inventive concepts disclosed herein.

What is claimed is:

1. A computer-based system for detecting malicious programs, the system comprising:
   a processing system having at least one processor configured to:
      receive a plurality of events of program execution;
      classify the received events as malicious or non-malicious;
      collect information about unclassifiable events, said unclassifiable events include events that cannot be classified as malicious or non-malicious with a predefined degree of certainty;
      format the collected event-related information for presentation to a program analyst, wherein formatting comprises:
         generating a list of unclassifiable events;
         removing duplicate events from the generated list;
         providing program code associated with one or more listed events; and
         providing reference information about one or more listed events, including one or more of (i) malicious behavior patterns associated with one or more events, and (ii) family of functions, objects and programs associated with one or more events; and
   an analyst workstation connected to the processing system, the workstation including:
      a head-mounted video display with headphones for isolating the program analyst from external audiovisual stimuli and displaying the list of unclassifiable events and the formatted event-related information to the program analyst; and
      a user input device operable to receive analyst's physiological response indicative of whether the displayed unclassifiable events are malicious, wherein the user input device includes one or more of (i) a push-button device responsive to analyst's finger movements; (ii) a pressure sensor responsive to analyst's finger movements; (iii) a video camera monitoring analyst's eye movements; (iv) an audio sensor detecting analysis voice commands; and (v) an electrical sensor monitoring analyst's biosignals.

2. The system of claim 1, wherein to receive a plurality of events of program execution, the processor further configured to emulate execution of the program code and monitor events of program execution.

3. The system of claim 1, wherein the head-mounted video display includes one of a video glasses and a video helmet.

4. The system of claim 1, wherein providing reference information about one or more listed events further includes (i) frequency of occurrence of the unclassifiable event during program emulation; and (ii) frequency of occurrence of the unclassifiable event in known malicious programs.

5. The system of claim 1, wherein the processor is being further configurable to:
   determine a type of malware to which an unclassifiable event is attributed;
   select an analyst specializing in analysis of events of said type of malware; and
   provide said event and the event-related information to the selected analyst.

6. A computer-implemented method for detecting malicious programs, the method comprising:
   receiving a plurality of events of program execution;
   classifying the received events as malicious or non-malicious;
   collecting event-related information about unclassifiable events, said unclassifiable events include events that cannot be classified as malicious or non-malicious with a predefined degree of certainty;
   formatting the collected event information for presentation to a program analyst, wherein formatting comprises:
      generating a list of unclassifiable events;
      removing duplicate events from the generated list;
      providing program code associated with one or more listed events; and
      providing reference information about one or more listed events, including one or more of (i) malicious behavior patterns associated with one or more events, and (ii) family of functions, objects and programs associated with one or more events;
   presenting the formatted list of unclassifiable events and event-related information to the program analyst via a head-mounted video display with headphones that isolates the program analyst from external audiovisual stimuli;
   detecting via a user input device analyst's physiological response to the presented information, wherein the user input device includes one or more of (i) a push-button device responsive to analyst's finger movements; (ii) a pressure sensor responsive to analyst's finger movements; (iii) a video camera monitoring analyst's eye movements; (iv) an audio sensor detecting analysis voice commands; and (v) an electrical sensor monitoring analyst's biosignals; and
   determining based on the detected physiological response whether the presented unclassifiable events are malicious.

7. The method of claim 6, wherein receiving a plurality of events of program execution includes emulating execution of the program code and monitoring events of program execution.

8. The method of claim 6, wherein classifying events includes comparing the generated events with a pattern of events associated with a malicious program.

9. The method of claim 6, wherein providing reference information about one or more listed events further includes (i) frequency of occurrence of the unclassifiable event during program emulation; and (ii) frequency of occurrence of the unclassifiable event in known malicious programs.

10. The method of claim 6, further comprising:
   determining a type of malware to which an unclassifiable event is attributed;
   selecting an analyst specializing in analysis of events of said type of malware; and
   providing said event and the event-related information to the selected analyst.

11. The method of claim 6, wherein the head-mounted video display includes one of a video glasses and a video helmet.

12. The method of claim 7, wherein monitoring an event includes detecting at least one of one or more program's system calls and one or more system's responses thereto.

13. A computer-based malware detection system comprising:
- a data store of malware-related information;
- a processing system configured to:
  - classify one or more program events as malicious or non-malicious using at least malware-related information from the data store;
  - format malware-related information associated with an unclassifiable program event for presentation to a program analyst, said unclassifiable events include events that cannot be classified as malicious or non-malicious with a predefined degree of certainty, and wherein formatting malware-related information comprises:
    - generating a list of unclassifiable events;
    - providing program code associated with one or more listed events; and
    - providing malware-related information about one or more listed events, including one or more of (i) malicious behavior patterns associated with one or more events, and (ii) family of functions, objects and programs associated with one or more events; and
- a head-mounted video display with headphones for isolating the program analyst from external audiovisual stimuli and displaying to the program analyst at least a portion of the program code associated with the one or more unclassifiable events and malware-related information; and
- a user input device operable to receive analyst's physiological response indicative of whether the displayed unclassifiable program exhibits malicious behavior, wherein the user input device includes one or more of (i) a push-button device responsive to analyst's finger movements; (ii) a pressure sensor responsive to analyst's finger movements; (iii) a video camera monitoring analyst's eye movements; (iv) an audio sensor detecting analysis voice commands; and (v) an electrical sensor monitoring analyst's biosignals.

14. The system of claim 13, wherein the head-mounted video display includes one of a video glasses and a video helmet.

15. The system of claim 13, wherein providing malware-related information about one or more listed events further includes (i) frequency of occurrence of the unclassifiable code during program emulation; and (ii) frequency of occurrence of the unclassifiable code in known malware.

16. The system of claim 13, wherein the processing system being further operable to:
- determine a type of malware to which an unclassifiable event is attributed;
- select an analyst specializing in analysis of events of said type of malware; and
- provide said event and the event-related information to the selected analyst.

17. The system of claim 13, wherein the malware-related information includes behavior patterns known malware.

* * * * *